(12) United States Patent
Herrmann

(10) Patent No.: US 10,124,898 B2
(45) Date of Patent: Nov. 13, 2018

(54) SEAT BENCH DEVICE WITH A SEAT BENCH COMPONENT AND AT LEAST ONE RESTRAINING UNIT

(71) Applicant: AIRBUS HELICOPTERS DEUTSCHLAND GMBH, Donauworth (DE)

(72) Inventor: Marius Herrmann, Gersthofen (DE)

(73) Assignee: Airbus Helicopters Deutschland GmbH, Donauworth (DE)

(*) Notice: Subject to any disclaimer, the term of this patent is extended or adjusted under 35 U.S.C. 154(b) by 5 days.

(21) Appl. No.: 15/388,183

(22) Filed: Dec. 22, 2016

(65) Prior Publication Data
US 2018/0178914 A1    Jun. 28, 2018

(51) Int. Cl.
B64D 11/06    (2006.01)

(52) U.S. Cl.
CPC ................. B64D 11/062 (2014.12)

(58) Field of Classification Search
CPC ....... B64D 11/062; B60R 22/00; B60R 22/18; B60R 22/26; B60R 22/34; B60R 2022/003; B60R 2022/008
USPC ........ 297/481, 480, 478, 473, 475, 476, 479
See application file for complete search history.

(56) References Cited

U.S. PATENT DOCUMENTS

| | | | | |
|---|---|---|---|---|
| 4,477,041 A * | 10/1984 | Dunne | ................... | B64D 25/06 244/122 AG |
| 6,709,062 B2 * | 3/2004 | Shah | ................... | A42B 3/0473 2/410 |
| 6,773,075 B2 * | 8/2004 | Rouhana | ................. | B60R 22/26 242/378.4 |
| 2006/0061202 A1 * | 3/2006 | Meneses | ................. | B60R 22/26 297/475 |
| 2006/0237586 A1 * | 10/2006 | Barackman | ............ | B64D 11/06 244/118.6 |
| 2008/0191540 A1 | 8/2008 | Morris | | |
| 2012/0025588 A1 * | 2/2012 | Humbert | ................. | B60N 2/24 297/480 |
| 2013/0099536 A1 | 4/2013 | Mason et al. | | |

(Continued)

FOREIGN PATENT DOCUMENTS

| | | |
|---|---|---|
| DE | 102013002887 | 8/2014 |
| EP | 2479072 | 7/2012 |

(Continued)

OTHER PUBLICATIONS

Extended European Search Report for European Application No. EP 15400034.3, Completed by the European Patent Office, dated Jan. 8, 2016, 8 Pages.

*Primary Examiner* — Mark R Wendell
(74) *Attorney, Agent, or Firm* — Brooks Kushman P.C.

(57) ABSTRACT

A seat bench device with a seat bench component and at least one restraining unit. the seat bench component comprising a seating surface and a backrest, and the at least one restraining unit comprising a harness for restraining a seat bench occupant on the seat bench component, wherein at least two guide elements are provided and wherein the at least one restraining unit is movably arranged on the at least two guide elements for being movable on the at least two guide elements along the backrest at least between a storage position and an operating position, in which the harness is operational for buckling up of a seat bench occupant.

20 Claims, 7 Drawing Sheets

(56) References Cited

U.S. PATENT DOCUMENTS

| | | | | |
|---|---|---|---|---|
| 2014/0139005 A1* | 5/2014 | Rouhana | ................ | B60R 22/02 |
| | | | | 297/476 |
| 2014/0145481 A1* | 5/2014 | Boren | .................... | B64D 11/06 |
| | | | | 297/248 |
| 2015/0183396 A1* | 7/2015 | Humbert | ............ | B60R 22/4619 |
| | | | | 242/389 |
| 2016/0039387 A1 | 2/2016 | Taubert et al. | | |

FOREIGN PATENT DOCUMENTS

| | | |
|---|---|---|
| EP | 2738095 | 6/2014 |
| FR | 2684067 | 5/1993 |
| WO | 2014035549 | 3/2014 |

\* cited by examiner (A) 
(B)

(A) 
(B)

(A)

(B)

(C)

(D)

(A)

(B)

(C)

SEAT BENCH DEVICE WITH A SEAT BENCH COMPONENT AND AT LEAST ONE RESTRAINING UNIT

BACKGROUND OF THE INVENTION (1) Field of the Invention

The invention is related to a seat bench device with a seat bench component and at least one restraining unit, said seat bench device comprising the features of claim 1. The invention is further related to a restraining unit for a seat bench device with a seat bench component, said at least one restraining unit comprising the features of claim 15.

(2) Description of Related Art

Aircrafts, and in particular rotorcrafts, are equipped with seat bench devices having seat bench components that are adapted for providing a plurality of seats for passengers of the aircraft. In the context of the present invention, the term "passenger" designates any person that is transported on board of the aircraft and, thus, supposed to occupy a seat in the aircraft. Therefore, such passengers are also referred to as the "occupants" of the seat bench components, i.e. as the "seat bench occupants".

Usually, the requirements for a configuration of a given seat bench device is based on a predefined body size, i.e. shoulder width, of a presumed largest seat occupant. The predefined body size is adopted as minimum seat width in seat development and used as a basis for manufacturing individual seats that are stringed together to define seat bench devices, wherein all seats are provided with identical and usually too large seat geometries. Such a seat bench device is e.g. described in the document FR 2 684 067 A1.

However, with such seat bench devices a predetermined seat density in the aircraft cannot be optimized for seat bench occupants with different body sizes. In other words, seat bench occupants having smaller body sizes than the predefined body size cannot sit closer together than seat bench occupants with larger body sizes in order to increase a possible number of seated occupants, as an underlying seating distance and density is only dependant on a respective seat geometry of each individual seat and the position of corresponding seat belts. Furthermore, such a seat bench device with stringed individual seats cannot be used as medical gurney, if necessary, as there is no continuous seating surface available. It should be noted that in the context of the present invention the term "continuous seating surface" should be construed as defining a seating surface that is uninterrupted, i.e. not interrupted by gaps, protrusions and so on.

The document US 2008/0191540 A1 describes a seat bench device with individual seats that are stringed together such that they define an elongated seating surface that is interrupted by gaps. Each stringed individual seat is provided with two separate restraining systems that allow seating of seat bench occupants with different body sizes on the seat bench device.

However, while the restraining systems are adapted for seat bench occupants with different body sizes, seat bench occupants having smaller body sizes can still not sit closer together than seat bench occupants with larger body sizes to increase a possible number of seated occupants. Furthermore, while the seat bench device could be used as medical gurney due to the elongated seating surface, it still does not define a continuous seating surface.

The documents DE 10 2013 002 887 A1, WO 2014/035549 A1 and EP 2 479 072 A1 describe seat bench devices with continuous seating surfaces. These seat bench devices are provided with configurable restraining systems that can be adapted for use with seat bench occupants having different body sizes by means of a reconfiguration of an underlying seating position scheme. The restraining systems are all seat belt-based and comprise respective seat belts that can be fastened to associated engagement members.

However, in these seat bench devices the seat belts of the corresponding restraining systems are arranged at predetermined positions, i.e. fixedly and unmovably, and can thus either not be moved when re-configuring the underlying seating position scheme, as e.g. according to the document EP 2 479 072 A1, or must be removed entirely, i.e. demounted, as e.g. according to the documents DE 10 2013 002 887 A1 and WO 2014/035549 A1. Consequently, these seat bench devices are invariable and re-configuration thereof is complicated and time-consuming.

It should be noted that according to the document EP 2 479 072 A1 the engagement members can be displaced to a certain extent. Such a possible displacement of the engagement member is a well-known feature and already described in other documents, such as e.g. the document US 2013/0099536 A1. However, while such a displacement provides a certain flexibility to the corresponding restraining system as such, the re-configuring thereof as described above is still cumbersome and complex as the seat belts thereof are fixedly and unmovably mounted to the seat bench devices.

BRIEF SUMMARY OF THE INVENTION

It is, therefore, an object of the present invention to provide a new seat bench device with a seat bench component and at least one restraining unit, said seat bench device having an easy to operate, flexible and configurable seating position scheme.

This object is solved by a seat bench device with a seat bench component and at least one restraining unit, said seat bench device comprising the features of claim 1.

More specifically, according to the present invention a seat bench device with a seat bench component and at least one restraining unit is provided. The seat bench component comprises a seating surface and a backrest. The at least one restraining unit comprises a harness for restraining a seat bench occupant or an object on the seat bench component. At least two guide elements are provided and the at least one restraining unit is movably arranged on the at least two guide elements for being movable on the at least two guide elements along the backrest at least between a storage position and an operating position, in which the harness is operational for buckling up of a seat bench occupant or an object.

Advantageously, each restraining unit is provided as a dedicated unit and completely and entirely movable. Thus, each restraining unit can easily and quickly be moved aside the backrest in order to provide a smooth and harness free backrest.

According to one aspect of the present invention, a seat bench device is provided that is adapted for a variable lateral positioning of associated restraining units that are provided for each seat bench occupant of or each object disposed on a preferably continuous seating surface of the seat bench component. This seat bench device is not limited to use in aircrafts and can likewise be applied to other vehicles in general. Furthermore, this seat bench device is not limited to a specific number of seat bench occupants or objects. Instead, any desired number of restraining units can be added to the inventive seat bench device.

Preferably, the inventive seat bench device comprises at least two linear guides as guide elements for fixing of the restraining units, and optionally a third linear guide. These linear guides can be fixed directly within the vehicles body, e.g. in fixed-wing aircrafts, busses, etc., if no energy absorbing system for limiting vertical deceleration in a possible crash situation is needed. In rotorcrafts, the linear guides are preferably connected to an associated energy absorbing system.

According to one aspect of the present invention, the linear guides can be of any profile, e.g. a common seat and cargo track. Furthermore, the linear guides do not necessarily have to be embraced by the restraining units, thus allowing an easy removal thereof.

Advantageously, the inventive seat bench device allows for an improved space consumption and comfort. In particular, a needed space for seat bench occupants is no longer determined by a fixed seat geometry or seat belts and is now only dependent on a naturally varying body size, i.e. shoulder width, of the seat bench occupants. More specifically, the real body size, i.e. shoulder width, of the seat bench occupants advantageously defines a respective seating density instead of a predefined seat geometry, so that an adjustable seating density and an improved seating comfort can be achieved. Furthermore, one or more of all provided restraining units can be moved aside, if not needed, thus allowing more space for respectively seated seat bench occupants or special mission equipment. This mutatis mutandis applies to objects that are disposed on the inventive seat bench device.

According to a preferred embodiment, the at least one first guide element is arranged in a region between the seating surface and the backrest. At least one second guide element is arranged in a region of a top end of the backrest.

According to a further preferred embodiment, the at least one first guide element and the at least one second guide element are embodied as linear rods.

Preferably, such linear rods comprise a circular or rectangular cross section. However, other cross sections are likewise applicable, such as e. g. oval and so on.

According to a further preferred embodiment, the at least one restraining unit comprises a plurality of slidable attachment units that are glidingly mounted to the at least two guide elements. The harness is mounted to the plurality of slidable attachment units.

According to one aspect of the present invention, all restraining units are identical and implemented as dedicated units. They can preferably be moved easily and independently on the preferentially three guide elements and can be fixed at desired and arbitrarily selectable lateral positions on the seat bench component with quick release fittings, preferably even by an untrained user.

Preferably, the guide elements lead all forces of the seat bench occupants or objects mass inertia that are occurring in a crash situation from corresponding restraining units into the seat bench device's structure. Thereby, upper guide elements hold corresponding head restraints and shoulder harnesses and a lower guide element that is arranged in a region between the backrest and the continuous seating surface holds corresponding pelvic harnesses. Each guide element can be of any suitable profile, for example tubes, rectangles or half enclosed profiles.

According to a further preferred embodiment, at least one locking device is provided. The at least one locking device is at least adapted for locking the at least one restraining unit on at least one of the at least two guide elements in the operating position.

According to a further preferred embodiment, the at least one attachment element of the plurality of slidable attachment units is equipped with the at least one locking device.

According to a further preferred embodiment, the at least one restraining unit comprises a folding device that is adapted for maintaining the at least one restraining unit at least in the storage position in a folded state.

According to a further preferred embodiment, the folding device is operable for unfolding the at least one restraining unit in the operating position.

According to a further preferred embodiment, the at least one restraining unit comprises a plurality of slidable attachment elements that are interconnected in pairs by means of associated frame members and glidingly mounted to the at least two guide elements. The harness is mounted to the plurality of slidable attachment elements. The folding device comprises a plurality of struttings that are pivotally mounted to the plurality of slidable attachment elements. The plurality of struttings is rotatable relative to the associated frame members for unfolding the at least one restraining unit.

According to a further preferred embodiment, a plurality of restraining units is provided, each being movably arranged on the at least two guide elements for being movable on the at least two guide elements along the backrest at least between the storage position and an associated operating position.

Advantageously, use of such movable restraining units enables creation of variable seating positions on the seat bench component. Preferably each restraining unit is a dedicated unit and can be moved independently to a desired lateral seating position on the preferably continuous seating surface of the seat bench component. Furthermore, each restraining unit can be folded and moved aside, if not needed. This allows for flexibility in seat bench occupant number on the basis of adjustments to personal anthropometrics and to specific mission requirements. For instance, with the inventive seat bench device it is possible to fit e.g. three 95th-Percentile male or four 5th-Percentile female troopers on the seat bench component.

According to a further preferred embodiment, a sled device is provided for glidingly mounting the seat bench component to associated supporting stanchions.

According to a further preferred embodiment, the seat bench component and the at least two guide elements are rigidly mounted to the sled device.

According to a further preferred embodiment, the sled device comprises an energy absorbing system that is adapted for absorbing energy in a crash situation.

According to one aspect of the present invention, the inventive seat bench device is provided with two or more vertical stanchions and the sled device. The two or more vertical stanchions are preferably connected via four aircraft seat and cargo track quick release fittings to corresponding floor and ceiling interface points of the vehicle. Thus, the required interface points can advantageously be limited to a minimum number of interface points.

The sled device preferably comprises the backrest, the continuous seating surface and the preferentially horizontally arranged guide elements for the restraining units, as well as plastically deformable tubes of the preferably two energy absorbing systems. The sled device as a whole can preferably move downwards along the vertical stanchions in a crash situation. During this downward movement, the tubes move through the energy absorbing system and provide a protective acceleration during seat stroking. The two energy absorbing systems are preferably fixed on the vertical stanchions and do not move relative to the vertical stanchions in the crash situation.

According to a further preferred embodiment, the at least one restraining unit comprises a head restraining component.

The present invention further provides a restraining unit for a seat bench device with a seat bench component that comprises a seating surface and a backrest. The at least one restraining unit comprises a harness for restraining a seat bench occupant or object on the seat bench component. The at least one restraining unit is adapted for being movably arranged on at least two guide elements of the seat bench device for being movable on the at least two guide elements along the backrest at least between a storage position and an operating position, in which the harness is operational for buckling up of a seat bench occupant or object.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
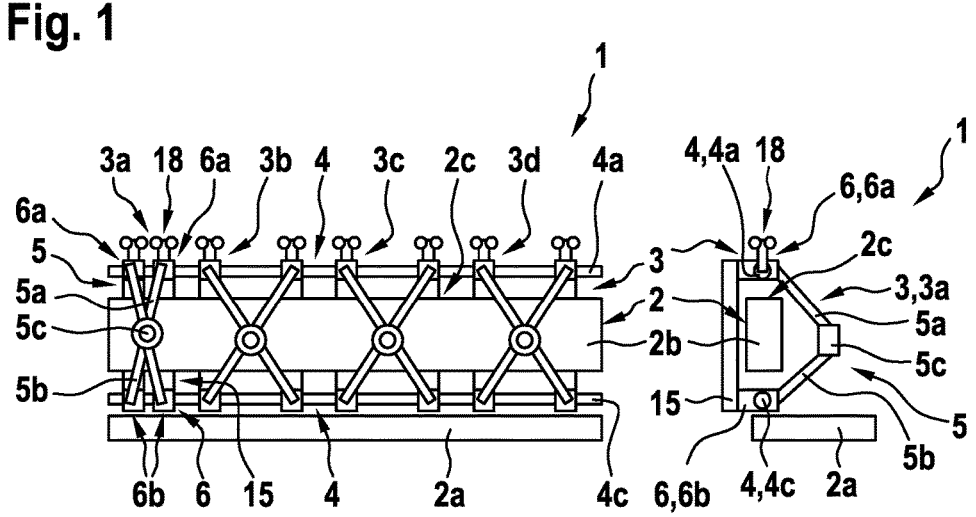
FIG. 1 shows a schematic view of a seat bench device according to the present invention.

FIG. 1 shows a seat bench device 1 according to the present invention. The seat bench device 1 comprises a seat bench component 2 and is preferentially adapted for use in a vehicle, preferably in an aircraft and, more preferably, in a rotorcraft.

The seat bench component 2 illustratively comprises at least a seating surface 2a and a backrest 2b with a top end 2c that illustratively points away from the seating surface 2a. The seating surface 2a is preferably embodied as a continuous seating surface and the backrest 2b is preferably embodied as a continuous backrest. As already described above, the term "continuous seating surface" should be construed in the context of the present invention as defining a seating surface that is uninterrupted, i.e. not interrupted by gaps, protrusions and so on. This applies mutatis mutandis to the term "continuous backrest".

According to one aspect of the present invention, the seat bench device 1 is equipped with a modular restraining system 3 that comprises at least one and exemplarily four preferably foldable restraining units 3a, 3b, 3c, 3d. The restraining unit 3a preferably comprises a harness 5 for restraining a seat bench occupant or object on the seat bench component 2. Furthermore, the restraining unit 3a preferentially comprises release levers 18, as described in more detail below with reference to FIG. 8 to FIG. 11.

By way of example, the harness 5 is composed of a shoulder harness 5a and a pelvic harness 5b. The shoulder and pelvic harnesses 5a, 5b are preferably interconnected and can be released from each other by means of an associated harness release buckle 5c.

It should be noted that only the harness 5 of the restraining unit 3a is labelled in FIG. 1. However, it should be noted that preferably also each one of the other restraining units 3b, 3c, 3d comprises such a harness for restraining a seat bench occupant or object on the seat bench component 2, as illustrated in FIG. 1. However, these harnesses are not labelled for simplicity and clarity of the drawings and for brevity and conciseness of the description only the harness 5 is described in detail.

It should further be noted that the composition of the harness 5 with the shoulder harness 5a and the pelvic harness 5b is only illustrated and described by way of example and not for limiting the invention accordingly. Instead, any suitable restraining unit is contemplated, such as e.g. seat-belt based restraining units and so on. Consequently, the term "harness" is supposed to embrace such alternative restraining units in the context of the present invention.

According to one aspect of the present invention, the seat bench device 1 is provided with a plurality of guide elements 4. Illustratively, the plurality of guide elements 4 comprises at least two and, by way of example, at least one first guide element 4c and at least one second guide element 4a. Preferentially, the at least one first guide element 4c and the at least one second guide element 4a lead the occurring forces of a seat bench occupant's or object's mass inertia from the restraining units 3a, 3b, 3c, 3d into an underlying seat bench structure.

Preferably, the first guide element 4c is arranged in a region between the seating surface 2a and the backrest 2b. The second guide element 4a is preferably arranged in a region of the top end 2c of the backrest 2b. Both, the first and second guide elements 4c, 4a are preferentially embodied as linear rods. Such linear rods may be provided with any suitable cross-section, such as e.g. circular, rectangular, oval and so on. Furthermore, the first and second guide elements 4c, 4a may generally be equipped with any suitable profile, such as e.g. tubes, rectangles or half enclosed profiles.

According to one aspect of the present invention, each one of the restraining units 3a, 3b, 3c, 3d is movably arranged on the first and second guide elements 4c, 4a for being movable on these guide elements 4c, 4a along the backrest 2b at least between a storage position and an operating position, in which the corresponding harness 5 is operational for buckling up of a seat bench occupant or object, preferably in a crashworthy manner. The operating position is preferably arbitrarily selectable and not necessarily predefined for each one of the restraining units 3a, 3b, 3c, 3d.

By way of example, the restraining unit 3a is shown in the storage position, while the restraining units 3b, 3c, 3d are shown in their respective operating positions. Preferentially, the restraining unit 3a is in a folded state in the storage position and the restraining units 3b, 3c, 3d are in unfolded states in their respective operating positions.

Preferably, the restraining unit 3a comprises a plurality of slidable attachment units 6 that are glidingly mounted to the first and second guide elements 4c, 4a. More specifically, each one of the slidable attachment units 6 comprises preferably at least shoulder harness attachment elements 6a, which are glidingly mounted to the second guide element 4a, and pelvic harness attachment elements 6b, which are glidingly mounted to the first guide element 4c.

The attachment elements 6a, 6b of the slidable attachment unit 6 are preferably interconnected in pairs by means of associated frame members 15 and preferentially adapted for mounting of the harness 5 to the slidable attachment unit 6. More specifically, the shoulder harness 5a is preferably mounted to the shoulder harness attachment elements 6a, and the pelvic harness 5b is preferably mounted to the pelvic harness attachment elements 6b.

It should be noted that only the slidable attachment unit 6 of the restraining unit 3a is labelled in FIG. 1. However, preferably also each one of the other restraining units 3b, 3c, 3d comprises such a slidable attachment unit for glidingly mounting these other restraining units 3b, 3c, 3d to the first and second guide elements 4c, 4a, as illustrated in FIG. 1. Nevertheless, these slidable attachment units are not labelled for simplicity and clarity of the drawings and for brevity and conciseness of the description only the slidable attachment unit 6 is described in detail.

Figure 2:
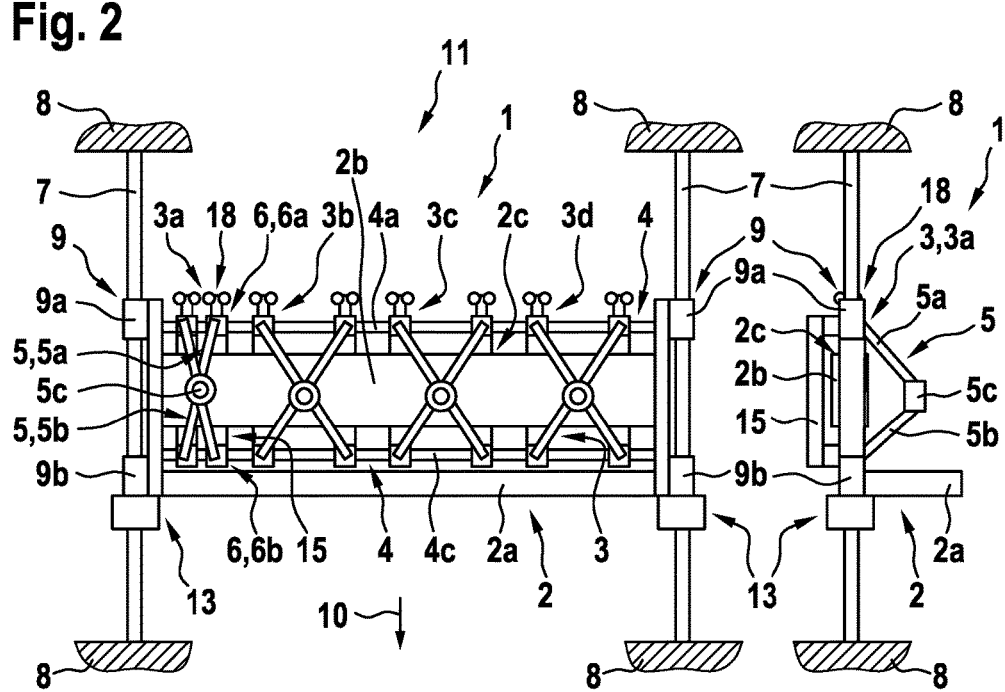
FIG. 2 shows a schematic view of a seat bench and stanchion system according to the present invention in normal operation mode.

FIG. 2 shows the seat bench device 1 of FIG. 1, which is provided with a sled device 9 according to one aspect of the present invention. The sled device 9 preferentially serves as an interface to associated seat bench stanchions 7 and is preferably provided for glidingly mounting the seat bench component 2 of FIG. 1 to associated seat bench stanchions 7. The latter illustratively define together with the seat bench device 1 and the sled device 9 a seat bench and stanchion system 11. By way of example, the sled device 9 is connected to at least two, and illustratively exactly two, associated seat bench stanchions 7.

The seat bench stanchions 7 are preferably connected via suitable aircraft seat and cargo track quick release fittings e.g. to corresponding floor and ceiling interface points of the vehicle. Illustratively, these floor and ceiling interface points are defined by an associated aircraft fuselage 8, in particular by an associated rotorcraft fuselage 8.

According to one aspect of the present invention, the seat bench component 2 and at least the first and second guide elements 4c, 4a of FIG. 1 are rigidly mounted to the sled device 9. The latter preferably further comprises an energy absorbing system 13 that is adapted for absorbing energy in a crash situation of the vehicle, to which the seat bench and stanchion system 11 is mounted, e.g. an aircraft.

It should be noted that the sled device 9 and the energy absorbing system 13 are provided as safety equipment of the inventive seat bench and stanchion system 11 for rendering the latter crashworthy. More specifically, in a crash situation of e.g. an aircraft, to which the seat bench and stanchion system 11 is mounted, the seat bench device 1 can be accelerated in direction of an arrow 10. In this case, the sled device 9 performs a gliding—in FIG. 2 downwardly directed—movement, as indicated with the arrow 10, along the associated seat bench stanchions 7. During this gliding downward movement, the energy absorbing system 13 decreases acceleration and force acting on a corresponding seat bench occupant or object. An exemplary energy absorbing system is described below with reference to FIG. 7.

Figure 3:
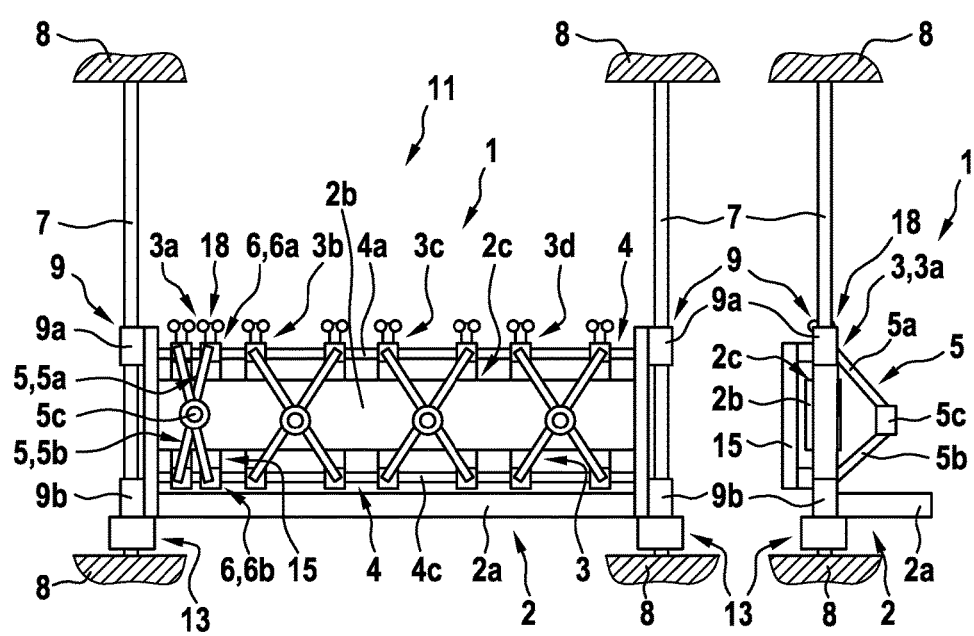
FIG. 3 shows a schematic view of the seat bench and stanchion system of FIG. 2 in an exemplary crash situation.

FIG. 3 shows the seat bench and stanchion system 11 of FIG. 2 after occurrence of a crash situation. As can be seen from FIG. 3 in comparison to FIG. 2, the seat bench device 1 has glided downward by means of the sled device 9 of FIG. 2 in direction of the arrow 10 of FIG. 2, illustratively until the energy absorbing system 13 has stroken the aircraft fuselage 8 and, thus, stopped the gliding downward movement. During the gliding downward movement, the energy absorbing system 13 has decreased acceleration and force acting on a corresponding seat bench occupant or object, as described above.

Figure 4:
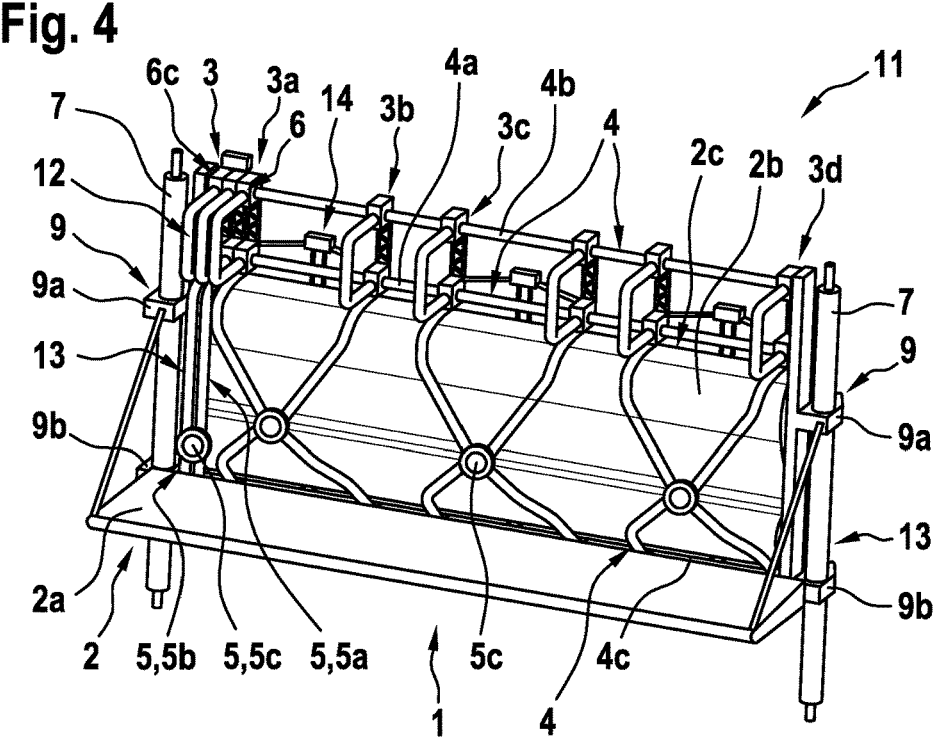
FIG. 4 shows a perspective front view of an exemplary realization of the seat bench and stanchion system of FIG. 2 with three unfolded restraining units, each having an inventive restraining unit folding device.

FIG. 4 shows the seat bench and stanchion system 11 of FIG. 2 with the seat bench device 1 having the seat bench component 2 and the restraining units 3a, 3b, 3c, 3d, and with the seat bench stanchions 7. As described above, the seat bench device 1 preferably comprises the energy absorbing system 13 and further comprises the first and second guide elements 4c, 4a that are rigidly mounted to the sled device 9.

As described above, the seat bench device 1 is, by way of example, equipped with the four restraining units 3a, 3b, 3c, 3d of FIG. 2, wherein the restraining unit 3a is exemplarily arranged in a folded state in the storage position, while the other restraining units 3b, 3c, 3d are arranged in the unfolded state in their respective operating positions. Such a configuration is e.g. adapted to allow seating of three 95th-Percentile male troopers on the seat bench component 2.

However, in contrast to what is described above, the restraining unit 3a, and similarly preferably also each one of the other restraining units 3b, 3c, 3d, now comprises an associated head restraining component 12, which is described in more detail below with reference to FIG. 8, as well as an associated folding device 14. Preferably, the head restraining component 12 is provided with associated slidable attachment elements 6c of the slidable attachment unit 6. The folding device 14 is preferentially adapted for maintaining the restraining unit 3a at least in its storage position in the folded state and is operable for unfolding the restraining unit 3a after having moved it to its operating position, as illustrated with respect to the restraining units 3b, 3c, 3d.

According to one aspect of the present invention, the seat bench device 1 now further comprises an additional, optional third guide element 4b in addition to the first and second guide elements 4c, 4a. This third guide element 4b is preferably also rigidly mounted to the sled device 9 and preferably—in FIG. 4 vertically—spaced apart from the second guide element 4a, such that the slidable attachment elements 6c are glidingly mounted to the third guide element 4b.

Figure 5:
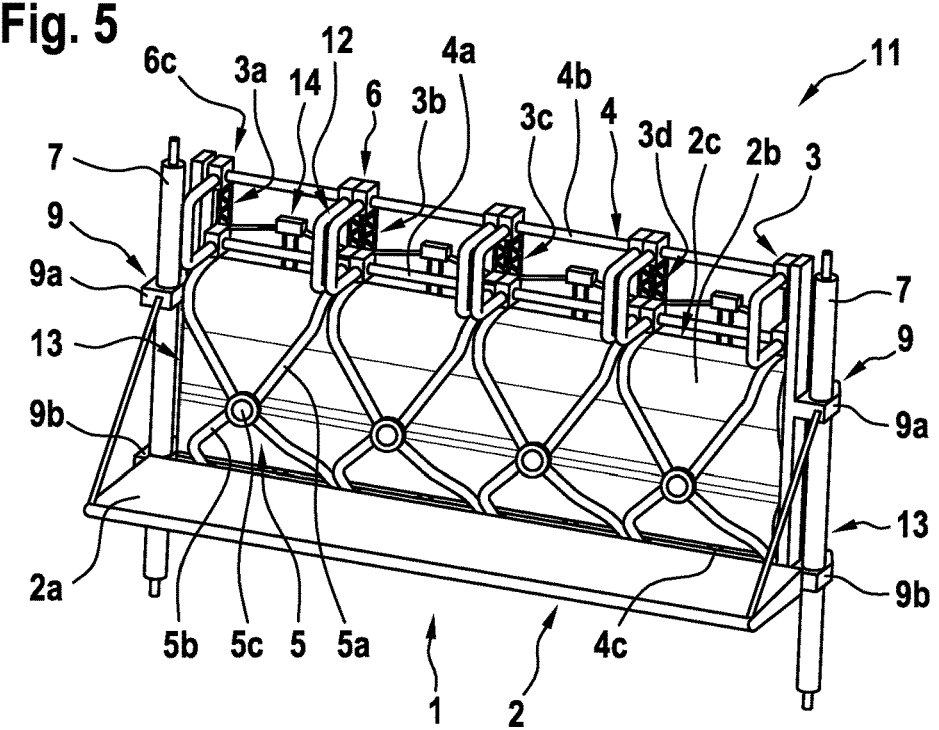
FIG. 5 shows a perspective front view of the exemplary realization of the seat bench and stanchion system of FIG. 4 with four unfolded restraining units.

FIG. 5 shows the seat bench and stanchion system 11 of FIG. 4 with the seat bench device 1 having the seat bench component 2 and all restraining units 3a, 3b, 3c, 3d being exemplarily arranged in the unfolded state in respective operating positions, and with the seat bench stanchions 7. Such a configuration is e.g. adapted to allow seating of four 5th-Percentile female troopers on the seat bench component 2.

Figure 6:
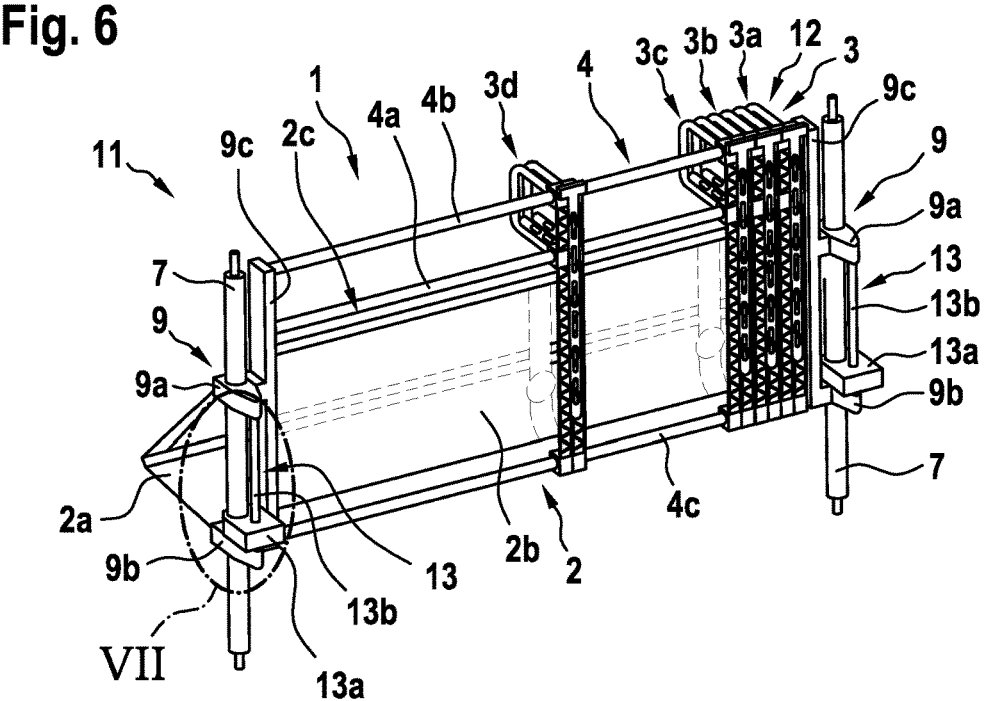
FIG. 6 shows a perspective rear view of the exemplary realization of the seat bench and stanchion system of FIG. 4 and FIG. 5 with four folded restraining units.

FIG. 6 shows the seat bench and stanchion system 11 of FIG. 4 with the seat bench device 1 having the energy absorbing system 13, the seat bench component 2 and all restraining units 3a, 3b, 3c, 3d with the head restraining components 12 being exemplarily in the folded state, and with the seat bench stanchions 7. The seat bench device 1 further comprises the first, second and third guide elements 4c, 4a, 4b, which are rigidly mounted to the sled device 9, preferably via suitable vertical connection bars 9c that are arranged at axial ends of the first, second and third guide elements 4c, 4a, 4b.

According to one aspect of the present invention, the sled device 9 comprises upper sled vertical guides 9a and lower sled vertical guides 9b, which are respectively spaced apart from each other in the longitudinal direction of the seat bench stanchions 7 and glidingly mounted to corresponding ones of the seat bench stanchions 7. These vertical guides 9a, 9b can be rigidly attached to the vertical connection bars 9c, or manufactured as integral components thereof, i.e. in one-piece structure.

Preferably, an energy absorbing base 13a of the energy absorbing system 13 is respectively arranged between each upper sled vertical guide 9a and a corresponding lower sled vertical guide 9b. Furthermore, preferentially at least one, and exemplarily exactly one, energy transmitting tube 13b is respectively arranged between each upper sled vertical guide 9a and a corresponding energy absorbing base 13a, as illustrated in greater detail in FIG. 7.

Figure 7:
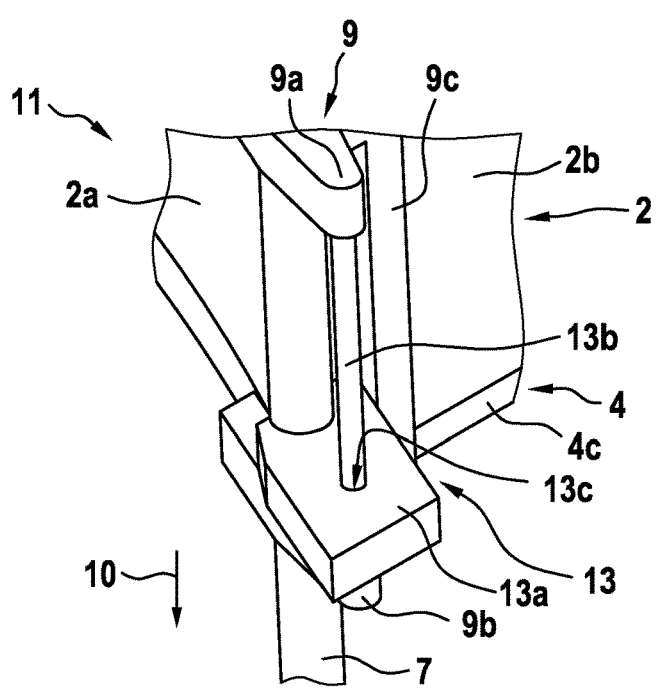
FIG. 7 shows an enlarged detail VII of FIG. 6.

FIG. 7 shows the seat bench component 2 and the energy absorbing system 13 of the seat bench and stanchion system 11 of FIG. 6 in greater detail for further illustrating the arrangement of the energy transmitting tube 13b between the upper sled vertical guide 9a of the sled device 9 and the energy absorbing base 13a of the seat bench stanchion 7 of FIG. 6. The energy transmitting tube 13b is preferably embodied as a plastically deformable tube, which is preferentially on one axial end supported by the upper sled vertical guide 9a and which engages on the other axial end at least partly an opening 13c provided in the energy absorbing base 13a.

In an exemplary crash situation, the seat bench component 2 and, consequently, the sled device 9 are accelerated in the direction of the arrow 10 of FIG. 2. Thus, the sled device 9 performs a gliding movement along the seat bench stanchion 7, which remains stationary, in the direction of the arrow 10. During this gliding movement, the upper sled vertical guide 9a pushes the energy transmitting tube 13b through the opening 13c provided in the energy absorbing base 13a. Preferably, the energy transmitting tube 13b is at least partly plastically deformed while being pushed through the opening 13c, so that crash energy is absorbed by decreasing acceleration and force acting on a seat bench occupant or object in the crash situation.

Figure 8:
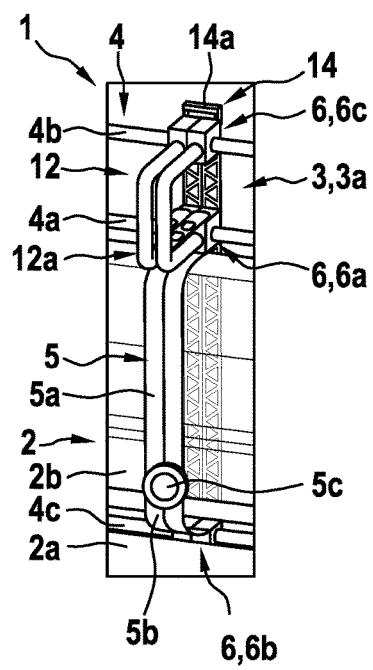
FIGS. 8 (A) and (B) show perspective front views of the seat bench device of FIG. 4 with a single restraining unit in folded and unfolded state.
Figure 8:
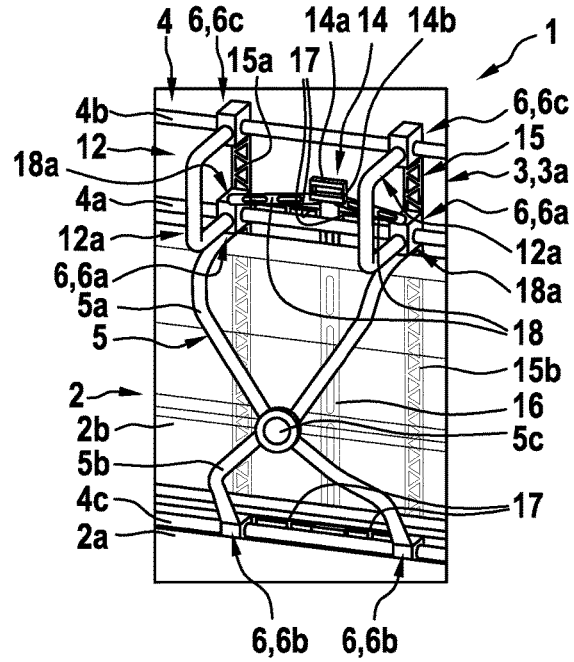

FIG. 8 shows the seat bench device 1 with the seat bench component 2 of FIG. 6 in front view. For simplicity and clarity of the drawings, however, the seat bench device 1 is only illustrated with the restraining unit 3a that comprises the harness 5, the head restraining component 12 and the folding device 14 of the modular restraining system 3 of FIG. 6. The head restraining component 12 preferably comprises lateral head retainers 12a.

Part (A) of FIG. 8 shows the restraining unit 3a in the folded state of FIG. 4. According to one aspect of the present invention, the restraining unit 3a can be maintained in the folded state by a release hand gear 14a of the folding device 14.

Part (B) of FIG. 8 shows the restraining unit 3a in the unfolded state of FIG. 5. According to one aspect of the present invention, the restraining unit 3a is maintained in the unfolded state by the release hand gear 14a.

More specifically, the release hand gear 14a preferably comprises pins 14b of the folding device 14 that engage openings (18d in FIG. 9) provided in the release levers 18 of FIG. 1 to FIG. 3 for blocking the restraining unit 3a in the unfolded state. The release levers 18 are preferentially connected to the shoulder harness attachment elements 6a of the slidable attachment unit 6 of FIG. 1 to FIG. 3.

Preferably, the release levers 18 are connected in a rotatable manner to the shoulder harness attachment elements 6a at associated pivot points 18a by means of trapezoid threads. Preferentially, the release levers 18 are arranged in parallel to the lateral head retainers 12a, i.e. in planes that are respectively spanned by the lateral head retainers 12a.

According to one aspect of the present invention, the folding device 14 further comprises a plurality of struttings 17, and illustratively four struttings 17, which are pivotally mounted to the slidable attachment unit 6, and preferentially to its shoulder harness attachment elements 6a and its pelvic harness attachment elements 6b. Thus, the plurality of struttings 17 is rotatable relative to the frame members 15 of FIG. 1 to FIG. 3 in order to allow an unfolding of the restraining unit 3a. Illustratively, the plurality of struttings 17 is further pivotally mounted to a vertical strutting 16, which is in turn connected to the release hand gear 14.

Preferably, the frame members 15 comprise at least two and, exemplarily, a first and a second vertical frame member element 15a, 15b. The first and second vertical frame member elements 15a, 15b are preferably respectively connected to the first, second and third guide elements 4b, 4a, 4c and corresponding ones of the plurality of struttings 17.

Figure 9:
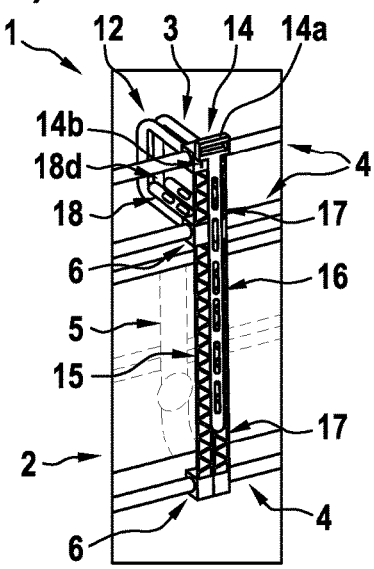
FIGS. 9 (A) and (B) show perspective rear views of the seat bench device of FIG. 4 with a single restraining unit in folded and unfolded state.
Figure 9:
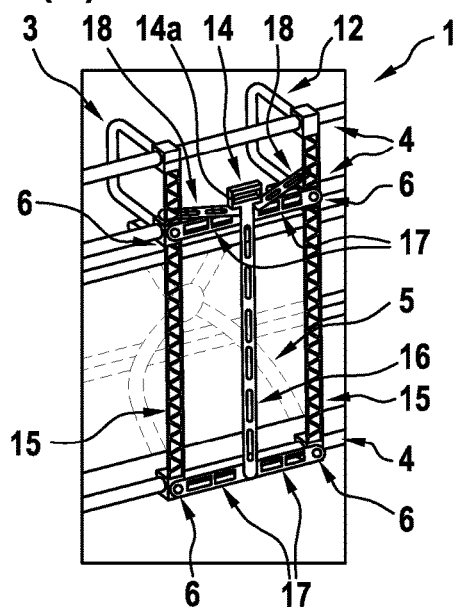

FIG. 9 shows the seat bench device 1 with the seat bench component 2 and the restraining unit 3a as well as the folding device 14 of FIG. 8 in rear view. Similar to FIG. 8, Part (A) of FIG. 9 shows the restraining unit 3a in the folded state and Part (B) of FIG. 9 shows the restraining unit 3a in the unfolded state.

As described above with reference to FIG. 8, the release hand gear 14a of the folding device 14 preferably comprises pins 14b that engage openings provided in the release levers 18 of FIG. 1 to FIG. 3 for blocking the restraining unit 3a in the unfolded state. These openings are labelled with the reference sign "18d" in FIG. 9.

Preferably, the pins 14b are further adapted for blocking the restraining unit 3a in the folded state. More specifically, according to one aspect of the present invention, the pins 14b are adapted for preventing a rotational movement of at least a part of the plurality of struttings 17 in the folded state of the restraining unit 3a.

Figure 10:
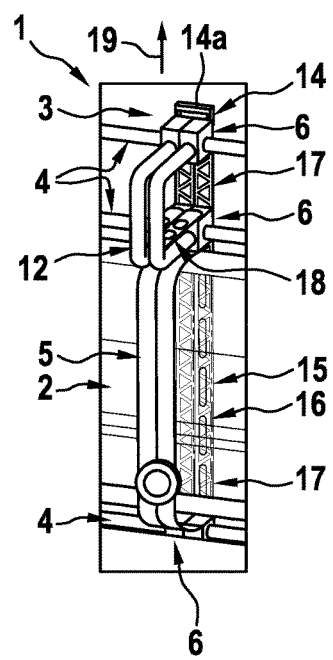
FIGS. 10 (A), (B), (C) and (D) show perspective front views of the seat bench device of FIG. 4 with a single restraining unit during an exemplary unfolding operation.
Figure 10:
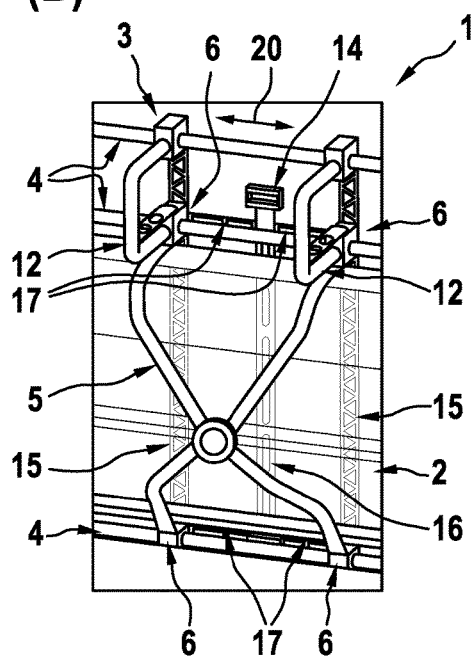
Figure 10:
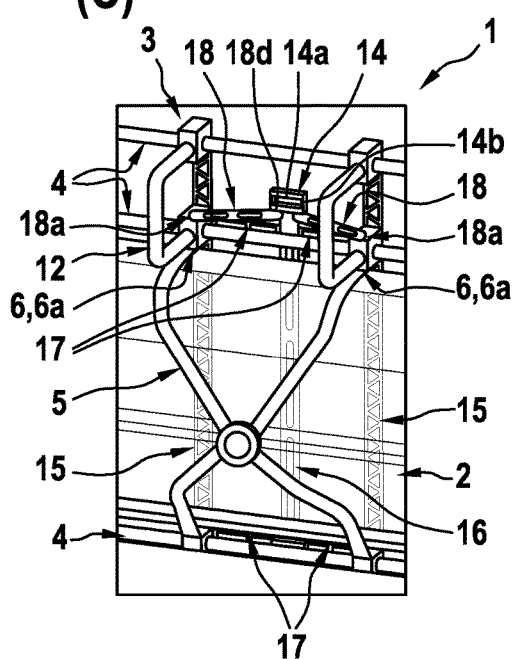
Figure 10:
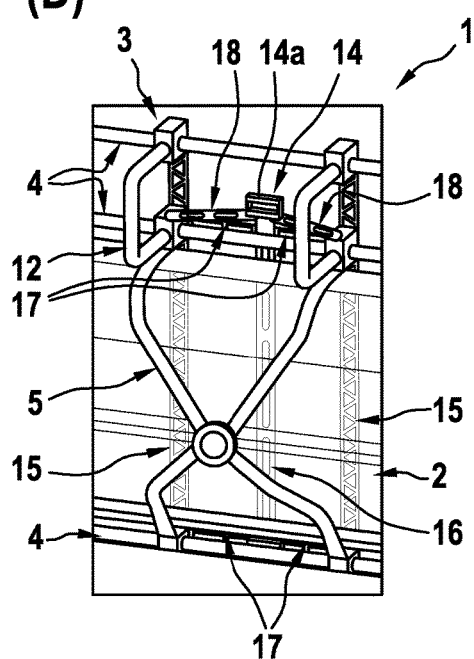

FIG. 10 shows the seat bench device 1 with the seat bench component 2 of FIG. 8 and FIG. 9 for illustrating an exemplary unfolding operation by means of the folding device 14. Similar to FIG. 8 and FIG. 9, the seat bench device 1 is only illustrated with the restraining unit 3a that comprises the harness 5, the head restraining component 12 with the lateral head retainers 12a and the folding device 14 of the modular restraining system 3.

Part (A) of FIG. 10 shows the restraining unit 3a in the folded state. In an initial unfolding step, the release hand gear 14a of the folding device 14 is moved during a release movement into a predetermined releasing direction 19. Exemplarily, this release movement consists in a pulling upwards of the release hand gear 14a.

Preferably, the release movement is adapted for releasing at least the above-mentioned part of the plurality of struttings 17. Thus, they may subsequently perform a rotational movement.

Part (B) of FIG. 10 shows a first subsequent unfolding step. In this first subsequent unfolding step, the first and second vertical frame member elements 15a, 15b of the frame members 15 that are connected to the plurality of struttings 17 are moved during an opening movement into a respective opening direction, as indicated with an arrow 20. This opening movement is e.g. performed by grasping the lateral head retainers 12a and pulling them apart into opposed directions, as illustrated with the arrow 20. Alternatively, only one of the lateral head retainers 12a is moved into one of the directions indicated with the arrow 20.

More specifically, the opening movement results in a rotation of the plurality of struttings 17 relative to the respective frame members 15 such that the vertical strutting 16 is moved downwards—in FIG. 10 -, i.e. into a direction that is opposed to the arrow 19. The opening movement is preferably stopped, i.e. blocked, when the plurality of struttings 17 is arranged at least approximately perpendicular to the vertical strutting 16.

However, it should be noted that the vertical strutting 16 can alternatively be rigidly attached to the first and second guide elements 4c, 4a, e.g. via suitable openings provided therein. In this case, the plurality of struttings 17 rotates relative to the rigidly attached vertical strutting 16.

Part (C) of FIG. 10 shows a second subsequent unfolding step. In this second subsequent unfolding step, the release levers 18 of the folding device 14 are rotated around the shoulder harness attachment elements 6a at the associated pivot points 18a by means of trapezoid threads towards the release hand gear 14a such that the pins 14b thereof coincide with the openings 18d of the release levers 18.

Part (D) of FIG. 10 shows a final unfolding step. In this final unfolding step, the release hand gear 14a is pushed towards the release levers 18. Illustratively, the release hand gear 14a is pushed downwards—in FIG. 10 -, i.e. into a direction that is opposed to the arrow 19. This pushing can be supported by suitable spring elements provided at the release hand gear 14a. Thus, the pins 14b are pressed into the openings 18d of the release levers 18 so that the restraining unit 3a is blocked in the folded state.

Figure 11:
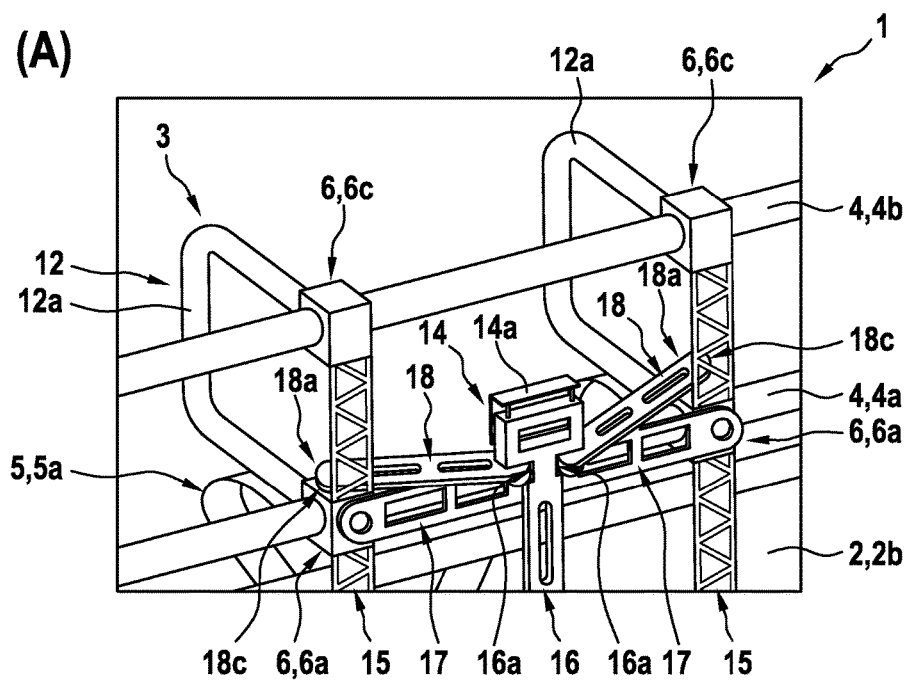
FIGS. 11 (A), (B) and (C) show perspective rear views of the restraining unit folding device of FIG. 4.
Figure 11:
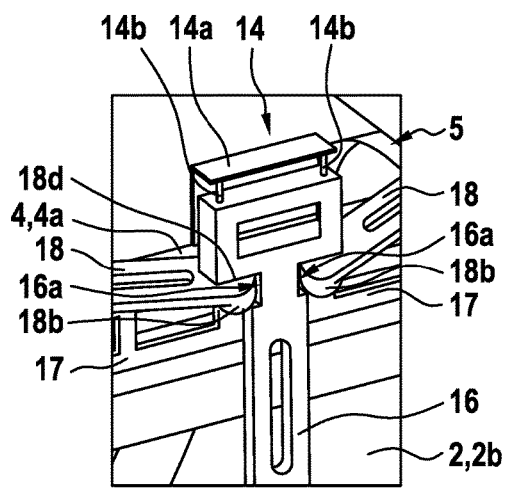
Figure 11:
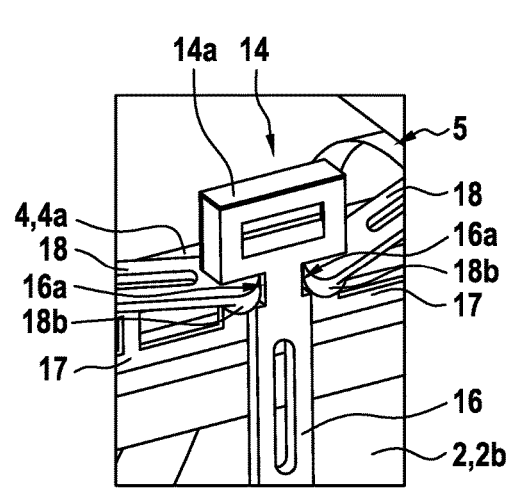

FIG. 11 shows the unfolding steps according to Part (C) and Part (D) of FIG. 10 in greater detail. More specifically, Part (A) and Part (B) of FIG. 11 show the seat bench device 1 of the preceding figures after accomplishment of the unfolding step of Part (C) of FIG. 10, i.e. prior to the final unfolding step of Part (D) of FIG. 10, and Part (C) of FIG. 11 shows the seat bench device 1 of the preceding figures after accomplishment of the unfolding step of Part (D) of FIG. 10.

Part (A) shows the release levers 18 of the folding device 14 that were rotated around the shoulder harness attachment elements 6a at the associated pivot points 18a by means of trapezoid threads towards the release hand gear 14a. Consequently, the pins 14b of the release hand gear 14a coincide with the openings (18d in FIG. 10) of the release levers 18.

According to one aspect of the present invention, at least one locking device 18c is provided for each one of the release levers 18. This at least one locking device 18c is preferably embodied as a quick release fitting and e.g. comprises the above-mentioned trapezoid thread and is at least adapted for locking the restraining unit 3a on the guide element 4a in the operating position of the restraining unit 3a, e.g. by pressing friction linings against the guide element 4a. Preferentially, the at least one locking device 18c is arranged on an associated one of the slidable attachment elements 6a of the slidable attachment unit 6.

Illustratively, the release levers 18 are rotated until they are at least partly received in clamping grooves 16a of the vertical strutting 16 of the folding device 14, preferably until a further rotation of the release levers 18 is blocked by these clamping grooves 16a. By way of example, the release levers 18 can be clamped, e.g. press-fitted into the clamping grooves 16a.

Part (B) of FIG. 11 further illustrates this exemplary clamping of the release levers 18 in the clamping grooves 16a. By way of example, the clamping is achieved by notch-like clamping elements 18b provided at the release levers 18. Part (B) further illustrates the pins 14b of the release hand gear 14a.

Part (C) shows an exemplary blocking of the release levers 18 at the vertical strutting 16 by means of the pins 14b, which now engage the openings 18d of the release levers 18. Thus, the release levers 18 are blocked at the vertical strutting 16 in their rotated state so that an undesired folding of the restraining unit 3a by means of the folding device 14 is securely and reliably prevented.

It should be noted that modifications to the above described embodiments are within the common knowledge of the person skilled in the art and, thus, also considered as being part of the present invention. For instance, an additional special restraining unit can be provided for mission equipment that is adapted to fixate equipment in a crashworthy manner on the seat bench component. Furthermore, heavy special mission equipment can be allocated next to a seat bench occupant, such as a trooper, on the seat bench component, thus allowing for a better accessibility and enabling faster and easier ingress and egress. Moreover, the continuous seating surface could be used as a gurney or additional stowage space, and so on.

Reference List 1 seat bench device
2 seat bench component
2a continuous seating surface
2b continuous backrest
2c continuous backrest top end
3 modular restraining system
3a, 3b, 3c, 3d restraining units
4 guide elements
4a first upper guide element
4b second upper guide element
4c lower guide element
5 harness
5a shoulder harness
5b pelvic harness
5c harness release buckle
6 slidable attachment units
6a shoulder harness attachment elements
6b pelvic harness attachment elements
6c head restraining component attachment element
7 seat bench stanchions
8 aircraft fuselage
9 seat bench sled device
9a upper sled vertical guides
9b lower sled vertical guides
9c vertical connection bars
10 downward sliding direction
11 seat bench and stanchion system
12 head restraining component 12a lateral head retainers
13 energy absorbing system
13a energy absorbing base
13b energy transmitting tube
13c base opening
14 restraining unit folding device
14a release hand gear
14b release hand gear pins
15 restraining unit vertical frame members
15a first vertical frame member element
15b second vertical frame member element
16 central vertical strutting
16a central vertical strutting clamping grooves
17 horizontal struttings
18 release levers
18a release lever pivot points
18b release lever clamping elements
18c release lever locking device
18d release lever opening
19 release hand gear releasing direction
20 restraining unit opening directions

What is claimed is:

1. A seat bench device with a seat bench component and a plurality of restraining units, the seat bench component comprising a seating surface and a backrest, and wherein each restraining unit comprises a harness for restraining a seat bench occupant on the seat bench component, wherein at least two guide elements are provided, wherein each restraining unit is movably arranged on the at least two guide elements for being movable on the at least two guide elements along the backrest at least between a storage position and an associated operating position, in which the harness is operational for buckling up of a seat bench occupant.

2. The seat bench device according to claim 1, wherein at least one first guide element is arranged in a region between the seating surface and the backrest, and that at least one second guide element is arranged in a region of a top end of the backrest.

3. The seat bench device according to claim 2, wherein at least one first guide element and the at least one second guide element are embodied as linear rods.

4. The seat bench device according to claim 1, wherein each restraining unit comprises a plurality of slidable attachment units that are glidingly mounted to the at least two guide elements, the harness being mounted to the plurality of slidable attachment units.

5. The seat bench device according to claim 4, wherein a plurality of locking devices is provided, each locking device being at least adapted for locking an associated one of the plurality of restraining units on at least one of the at least two guide elements in the operating position.

6. The seat bench device according to claim 5, wherein at least one slidable attachment element of the plurality of slidable attachment units is equipped with an associated one of the plurality of locking devices.

7. The seat bench device according to claim 1, wherein each restraining unit comprises a folding device that is adapted for maintaining the associated restraining unit at least in the storage position in a folded state.

8. The seat bench device according to claim 7, wherein the folding device is operable for unfolding the associated restraining unit in the operating position.

9. The seat bench device according to claim 8, wherein each restraining unit comprises first and second vertical frame members, each frame member having a pair of slidable attachment elements that are glidingly mounted to the at least two guide elements such that the first and second vertical frame members move relative to one another along the at least two guide elements between the storage position and the operating position, the harness being mounted to the first and second vertical frame members by way of the pairs of slidable attachment elements, wherein the folding device comprises a plurality of struttings that are pivotally mounted to the first and second vertical frame members via the slidable attachment elements, the plurality of struttings being rotatable relative to the first and second vertical frame members for unfolding the associated restraining unit.

10. The seat bench device according to claim 1, wherein a sled device is provided for glidingly mounting the seat bench component to associated supporting stanchions.

11. The seat bench device according to claim 10, wherein the seat bench component and the at least two guide elements are rigidly mounted to the sled device.

12. The seat bench device according to claim 11, wherein the sled device comprises an energy absorbing system that is adapted for absorbing energy in a crash situation.

13. A seat bench device comprising:
a seat bench component having a seating surface and a backrest;
first and second guide elements supported by the seat bench component; and
a foldable restraining unit comprising: first and second frame members, and a harness for restraining a seat bench occupant on the seat bench component, the harness being supported by the first and second frame members, wherein each of the first and second frame members are supported for translation on the first and second guide elements along the backrest such that the restraining unit is moveable along the backrest and such that the first and second frame members are moveable relative to one another, wherein the restraining unit is configured to move between (i) a storage position with the first and second frame members adjacent to one another and (ii) an operating position with the first and second frame members spaced apart from one another and with the harness operational for buckling up of a seat bench occupant.

14. The seat bench device of claim 13 wherein the foldable restraining unit further comprises a folding device configured to maintain the restraining unit in each of the storage position and the operational position, wherein the folding device comprises a release hand gear with first and second pins.

15. The seat bench device of claim 14 wherein the foldable restraining unit has a vertical strutting connected to the release hand gear, and first, second, third, and fourth struttings each pivotally mounted to the vertical strutting, wherein the first and second struttings are pivotally supported by first and second ends of the first frame member, respectively, and wherein the third and fourth struttings are pivotally supported by first and second ends of the second frame member, respectively; and
wherein the first and second pins are configured to prevent rotation of at least one of the first, second, third, and fourth struttings to maintain the restraining unit in the storage position.

16. The seat bench device of claim 14 wherein the foldable restraining unit further comprises first and second release levers rotatably supported by the first and second frame members, respectively; and wherein the first and second pins are configured to be received by first and second openings in the first and second release levers to maintain the restraining unit in the operational position.

17. The seat bench device of claim 16 further comprising a locking device having first and second quick release fittings associated with the first and second release levers, respectively, wherein the locking device is configured to lock the restraining unit with respect to at least one of the first and second guide elements.

18. A seat bench device with a seat bench component and at least one restraining unit, the seat bench component comprising a seating surface and a backrest, and the at least one restraining unit comprising a harness for restraining a seat bench occupant on the seat bench component, wherein at least two guide elements are provided, the at least one restraining unit being movably arranged on the at least two guide elements for being movable on the at least two guide elements along the backrest at least between a storage position and an operating position, in which the harness is operational for buckling up of a seat bench occupant, wherein the at least one restraining unit comprises a head restraining unit.

19. The seat bench device according to claim 18, wherein one of the at least two guide elements is arranged in a region between the seating surface and the backrest, and wherein another of the at least two guide elements is arranged in a region adjacent to a top end of the backrest.

20. The seat bench device according to claim 18, wherein a plurality of restraining units is provided, each restraining unit being movably arranged on the at least two guide elements for being movable on the at least two guide elements along the backrest at least between the storage position and an associated operating position.

* * * * *